United States Patent [19]

Haraikawa

[11] 3,752,271
[45] Aug. 14, 1973

[54] DUAL NETWORK HYDRAULIC BRAKE SYSTEM
[75] Inventor: Tetsuo Haraikawa, Funabashi-shi, Chiba-ken, Japan
[73] Assignee: Tokico Limited, Kawasaki-shi, Kanagawa-ken, Japan
[22] Filed: Aug. 23, 1971
[21] Appl. No.: 173,956

[30] Foreign Application Priority Data
Aug. 22, 1970 Japan..........................45/73728

[52] U.S. Cl............... 188/345, 60/54.5 E, 188/1 A, 188/151 A, 303/6 C
[51] Int. Cl............................................ B60t 11/20
[58] Field of Search................ 188/345, 106 P, 1 A, 188/349, 151 A; 303/6 C; 60/54.546 E

[56] References Cited
UNITED STATES PATENTS
3,358,446  12/1967  Wortz............................. 188/345 X
3,463,554  8/1969  Bueler............................. 188/151 A
3,477,549  11/1969  Barton............................. 188/345
3,508,793  4/1970  Bueler............................. 188/345 X Primary Examiner—George E. A. Halvosa
Attorney—Holman & Stern

[57] ABSTRACT

A hydraulic brake system for motor vehicles in which a master cylinder having two chambers is operably connected with a brake pedal. A plurality of wheel brake cylinders and a dual network hydraulic system connects the two chambers of the master cylinder with the wheel brake cylinders. A pressure regulator valve of a dual piston type is provided in the network and carries a movable contact for actuating an alarm device to indicate to the driver of an operational failure in the hydraulic system.

2 Claims, 2 Drawing Figures

Patented Aug. 14, 1973  3,752,271

DUAL NETWORK HYDRAULIC BRAKE SYSTEM

BACKGROUND OF THE INVENTION

This invention relates to improvements in and relating to a dual network hydraulic brake system for use with a powered and wheeled vehicle, especially an automotive vehicle.

It is highly desirable in a dual network hydraulic brake system to maintain, if possible, a certain predetermined ratio between the practical hydraulic pressures prevailing in the dual component hydraulic systems. The reason is such that an appreciable variation in the pressure ratio, when brought about, the brake force distribution among the front and rear wheel pairs will be correspondingly altered which results in a substantial disadvantage as commonly known pe se.

On the other hand, there is a sincere demand to detect and alarm a defect in the mutual hydraulic interruption between both component systems, and/or in the maintenance of the prescribed pressurized conditions of the latter, necessary for assurance of the regular and independent operation of the dual brake component systems, caused by such as pipe rupture, sealing defects and/or the like.

OBJECTS AND SUMMARY OF THE INVENTION

The main object of the present invention is to provide an improved dual network hydraulic brake system, capable of effectively compensating pressure deviations from the pressures necessary for practical maintenance of a predetermined ratio between the hydraulic component systems of the network, in an easy and automatic way, and of detecting an operational failure or extraordinary pressure deviation from the normal prevailing in either of the component systems.

The above and further objects, features and advantages of the invention become more apparent as the description proceeds by reference to the accompanying drawing.

DETAILED DESCRIPTION OF THE INVENTION

Referring now to the accompanying drawing, a preferred embodiment of the invention will be decribed in detail.

Figure 1:
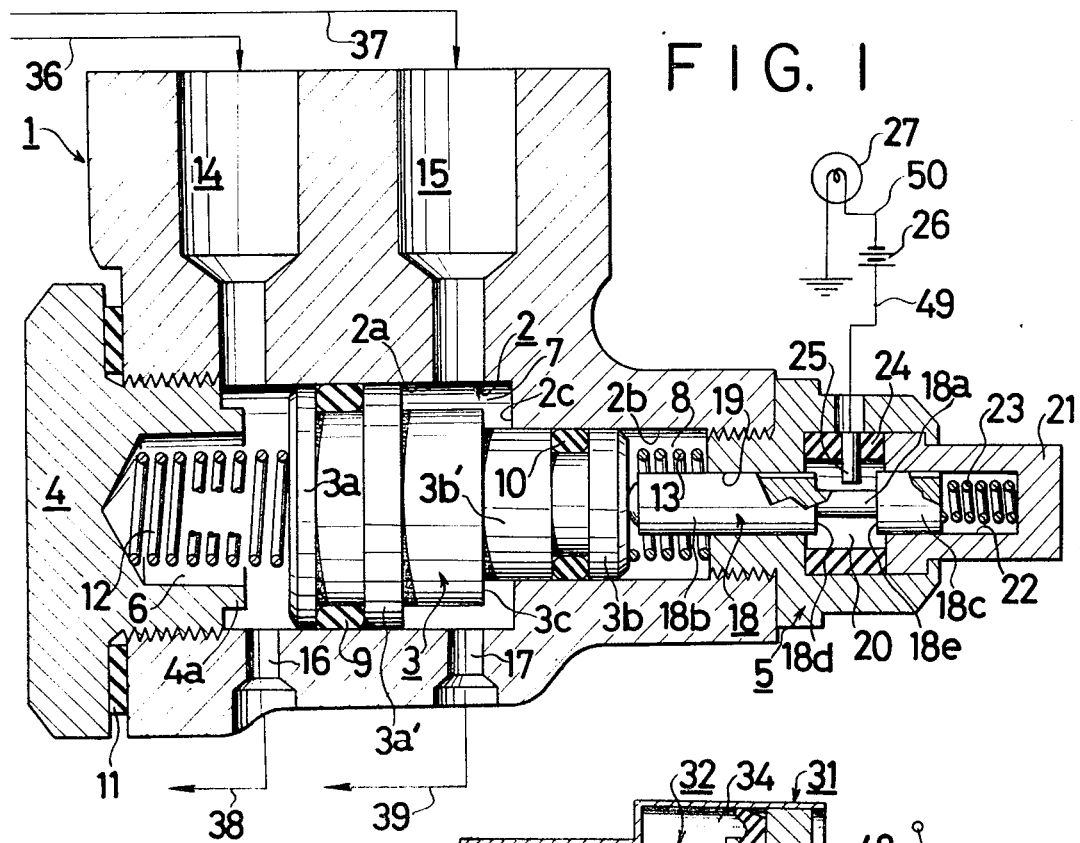
FIG. 1 is an axial section of a pressure regulator valve unit acting as a main component of the dual network hydraulic brake system according to the invention.

In FIG. 1, numeral 1 denotes a main body which is formed with a stepped bore 2 passing axially therethrough and having a larger bore part 2a and a smaller bore part 2b. A stepped piston 3 having a larger piston part 3a; 3a' and a smaller piston part 3b; 3b' corresponding to the cylinder bore parts 2a and 2b, respectively, is slidably received in the bore 2. The piston 3 is formed further with an intermediate diameter part 3c located between the larger and smaller piston parts as clearly seen in FIG. 1. The position of the intermediate piston part 3c is such that when the piston 3 is moved rightwards from the position shown in FIG. 1, it is brought into contact with a shoulder 2c defining the critical surface between the bore parts 2a and 2b and thus serving as a stop means for the position.

A screw plug 4 is screwed into the open outer end of the larger bore part 2a for tightly closing the same, with the plug being formed with an inwardly and axially extending cylindrical projection 4a adapted for contact with the outer end surface the larger piston part 3a when the piston 3 is moved leftwards from the position shown, thus serving as a stop for the piston.

A second plug 5 is screwed into the outer open end of smaller bore part 2b. In this way, there are three separate chambers or space 6, 7 and 8. More specially, a first hydraulic chamber 6 is defined between the larger piston part 3a and plug 4. A or intermediate second hydraulic chamber 7 is defined between the larger piston part 3a' and shoulder 2c and a third chamber 8 between the smaller piston part 3b and the second plug 5. The piston 3 has a larger working surface exposed to the first chamber 6 than that exposed to the second or intermediate chamber 7, with the ratio of these piston working surfaces being selected to a certain predetermined value $m : n$.

Sealing O-rings 9 and 10 are provided on the piston and the larger piston parts 3a and 3a', and between the smaller piston parts 3b and 3b', respectively. As seen, O-ring 9 serves for interrupting fluid communication between first and second chambers 6 and 7, In a similar way, O-ring 10 serves for the interruption of otherwise possible fluid communication between the second and third chambers 7 and 8, with the latter chamber being kept in normally communication with ambient atmosphere, as will be more fully described hereinafter. A sealing ring 11 is provided the between main body 1 and the plug 4 for fluid communication the between first chamber 6 and ambient atmosphere.

A first compression spring 12 is provided within the first chamber 6 between the plug 4 and piston 3. A second compression spring 13 is provided within the third chamber 8 between the second plug 5 and piston 3. By the provision of these springs 12 and 13, the piston 3 is normally kept in its neutral position as shown in FIG. 1.

Inlet ports 14 and 15 are formed in the main body 1, so as to provide fluid communication with the first and second chambers 6 and 7, respectively. Outlet ports 16 and 17 are also formed in main body 1, so as to discharge fluid from these chambers 6 and 7, respectively, as will be more fully described hereinafter. Oil flows introduced through the respective inlet ports 14 and 15 into first and second hydraulic chambers 6 and 7 are independent from each other and kept in a certain predetermined relative ratio in their quantity or feed rate.

The plug 5 is formed with a central and axial bore 19 and a push rod 18 is slidably received in the bore. This push rod 18 is provided with an intermediate reduced part 18a, an inner part 18b and an outer part 18c which are made integral into one piece as shown. The inner part 18b emerges from bore 19 into the third chamber 8 and its inner end is kept in pressure contact with the outer end of the smaller piston part 3b. The outer rod part 18c is slidably received in an axial blind bore 22 formed in a cap member 21 which is firmly coupled with the second plug 5. A compression spring 23 is provided within the blind bore 22 so as to urge the rod 18 to move leftwards in FIG. 1 for establishing a resilient pressure contact the push rod 18 with piston 3. In the second plug 5, a recess 20 is formed for providing a chamber by cooperation with the cap member 21. Between the second plug 5 and cap member 21, there is an insulator sleeve 24 which is held in position within the recess 20 without contact with push rod 18. An electrical contact 25 is held in position by the insulator sleeve 24 as shown and its tip end extends laterally therefrom towards the intermediate and reduced rod part 18a normally without contact therewith. Contact pin 25 is electrically connected through a lead 49, only schematically shown by a single line, to the positive side of a battery 26. With the piston 3 positioned in its neutral position as shown, the tip end of contact pin 25 is situated at an intermediate position between a pair of opposing shoulders 18d and 18e formed on push rod 18 which constitutes, in cooperation with contact pin 25, an electrical switch unit, as will become more apparent as the description proceeds.

This switch unit 18;24, battery 26, ground conductor 50 and an alarm lamp 27 inserted therein constitutes an alarm device when the switch unit is brought into actuation as will be described more fully. The lamp 27 is naturally mounted, preferably on an automotive instrument panel, arranged in proximity to the driver's seat.

Figure 2:
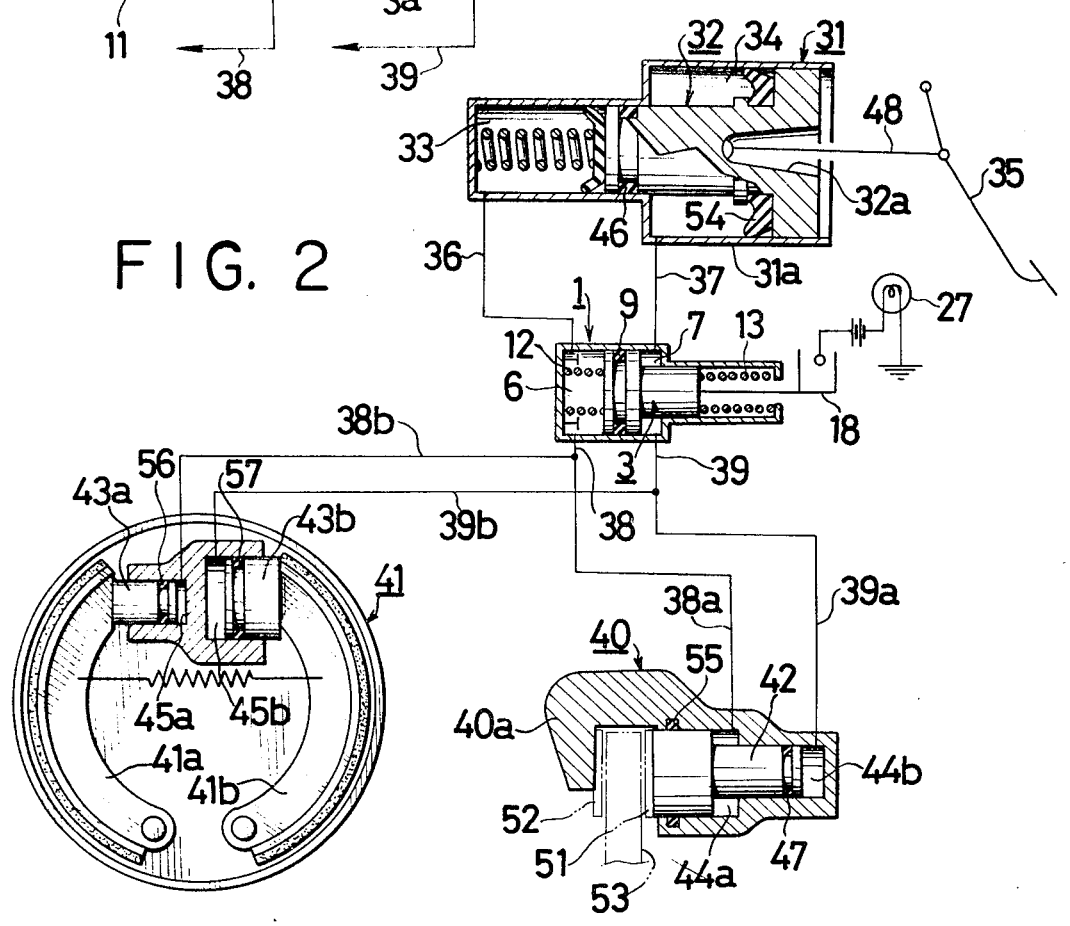
FIG. 2 is a view of an embodiment of the dual network brake system of the invention including the pressure regulator valve unit shown in FIG. 1.

The mechanism so far described by reference to FIG. 1 is arranged in a dual network hydraulic brake system as shown in FIG. 2.

In FIG. 2, numeral 31 generally represents a tandem master cylinder unit acting as an oil pressure generating and supply source to the hydraulic brake system as is conventional. The unit 31 comprises a stepped cylinder 31 and a stepped piston 32 slidably received therein, thus forming two separate hydraulic pressure-generating chambers 33 and 34 in the cylinder 31.

When a brake pedal 35 is actuated, motion will be transmitted as conventionally through a push rod 48 linked with the pedal and received in an axial recess 32a in the piston 32, to the piston. As seen from the foregoing and by reference to FIG. 2, pressure oil will be conveyed, by actuation of the brake pedal 35, from the chambers 33 and 34 through respective conduits 36 and 37 and at a certain predetermined relative ratio. In this way, oil is conveyed from the respective chambers 33 and 34 to the chambers 6 and 7 in a separate and independent way and at a certain predetermined relative ratio. Oil is delivered then from the first chamber 6 through conduits 38; 38b to a first hydraulic chamber 45a of a rear wheel drum brake unit 41, and concurrently from the second chamber 7 through conduits 39;39b to a second hydraulic chamber 45b of the same brake unit 41.

In a similar way and concurrently with the above mentioned oil delivery to the rear wheel brake unit 41, oil is delivered from the first chamber 6 through conduits 38;38a to a first chamber 44a of a front wheel disc type brake unit 40. Concurrently therewith, oil is also delivered from the second chamber 7 through conduits 39;39a to a second chamber 44b of the same brake unit 40.

By pressurizing the chambers 45a and 45b of the brake unit 41, its respective brake pistons 43a and 43b are hydraulically actuated in their expanding direction, so as to expand a pair of brake shoes 41a and 41b.

In a similar way, pressure oil conveyed from the chambers 6 and 7 respectively to pressure chambers 44a and 44b of the brake unit 40 will actuate a stepped piston 42 to move leftwards in FIG. 2, so as to exert a frictional braking force through a friction pad 51 onto the right-hand surface of a rotating brake disc 53, the same being only schematically shown by virtue of their popularity. Concurrently, a hydraulic reaction will be transmitted from the pressure oil now prevailing in the pressure chambers 44a and 44b to a movable yoke 40a, so as to apply a brake pressure therefrom through a friction pad 52 onto the right-hand surface of the rotating brake disc 53, again as conventionally.

Therefore, it will be seen from the foregoing description a first hydraulic brake system called "A" will be provided by the combination of a first hydraulic chamber 33 of master cylinder unit 31, piping 36, first chamber 6 of the mechanism 1, conduits 38; 38a; 38b and first pressure chamber 44a and 45a of the both wheel brake units 40 and 41. In a similar way, a second hydraulic brake system called "B" will be provided by the combination of second hydraulic chamber 34 of master cylinder unit 31, piping 37, second chamber 7 of the mechanism 1, conduits 39; 39a; 39b and second pressure chambers 44b and 45b of both brake units 40 and 41.

The hydraulic brake systems, "A" and "B" are hydraulically separated from each other, firstly by a first sealing member 46 mounted on master piston 32 of the unit 31, adapted for interruption of any fluid communication between the hydraulic chambers 33 and 34; secondly by O-ring 9 mounted on stepped piston 3 between the larger piston parts 3a and 3a', and thirdly by sealing ring 47 mounted on stepped brake piston 42 of the brake unit 40.

There is also provided a sealing means 54 mounted on stepped piston 32 of master clyinder unit 31 for sealing the hydraulic chamber 34 against ambient atmosphere.

Similarly, sealing means 55 is mounted in the inside bore wall of yoke 40a or on stepped brake piston 42 of front wheel bracke unit 40, so as to effectively seal off the first pressure chamber 44a against ambient atmosphere.

Similar sealing means 56 and 57 are mounted on brake pistons 43a and 43b, respectively, for sealing off the hydraulic chambers 45a and 45b against ambient atmosphere, respectively. These sealing means may be provided naturally in the respective bore walls, in place of the brake pistons.

The overall operation of the first embodiment so far shown and described is as follows:

It is now assumed that the automotive vehicle fitted with the dual network hydraulic brake system is running and the driver depresses the brake pedal 35 in its brake-actuating direction, so that master piston 32 advances leftwards in FIG. 2 as before, and thus both brake units 40 and 41 are brought into their brake-applying condition.

It is further assumed that there is no provision of the mechanism shown in FIG. 1. In this case, although pressure oil will be delivered from the first and second chambers 33 and 34 of the master cylinder unit 31 at a certain predetermined delivery rate during the working storke of pistion 32, the ratio between the oil pressure practically prevailing in both systems "A" and "B" will deviate generally from the predetermined value, because both systems downstream of the respective chambers 33 and 34 are not always designed to provide respective contact volumes for attaining the relative specific ratio until attainment of the required oil pressure. On the contrary, it is possible to obviate the above-mentioned defects by use of the novel arrangement as proposed by invention in which mutual pressure compensation between the both systems "A" and "B" is realized for the realization of certain predetermined pressure ratio, such as $n : m$ between both, with $n$ and $m$ being certain different integers.

It should be noted that working areas of piston 3 exposed to the respective hydraulic chambers 6 and 7 are designed to represent a specific mutual ratio of $m : n$. It will be easily seen, therefore, that when the practical pressure ratio between both hydraulic systems "A" and "B" fails to represent the specific ratio $n : m$, hydraulic pressures acting upon the piston 3 will become unbalanced and the piston will shift in one or another direction. By this piston movement, the effective volume of either one of chambers 6 and 7 is increased and that of the remainder is correspondingly reduced so as to compensate the oil pressure deviation between both systems for establishing and recovering the prescribed pressure ratio. In this pressure-compensating operation of piston 3, either one of springs 12 and 13 is expanded, while the other is reduced in its length by further compression, bu there is practically no adverse effect upon the compensation job, because these springs have been designed to have small spring constants only necessary for keeping the piston 3 in its neutral position upon release of a brake application.

In the course of the normal operation period, the piston 3 is subjected to only minor alteration in its movable stroke so that it is not brought into contact with the shoulder 2c or the projection 4a. With a slight compensation movement of piston 3, the push rod 18 will follow thereafter, but the switch unit comprising the opposing shoulders 18d and 18e acting as a movable contact member, and a stationary contact pin 25, is not brought into its closed position so that alarm lamp 27 may not be lit.

It, however, there is an operational failure of either of the hydraulic systems "A" and "B" by pipe rupture or other similar cause, or occasional rupture of any one of the aforementioned sealing means serving for interruption of hydraulic communication between the systems "A" and "B," this can be easily and instantly detected in the case of the present brake system.

When there is a substantial pressure drop in either of the systems "A" and "B" relative to the hydraulic pressure prevailing in the remainder, the stroke variation of piston 3 will become substantially larger than that encountered in the aforementioned pressure compensating operation for attaining and maintaining the prescribed pressure ratio of $n : m$. Therefore, the piston 3 may be brought into contact with shoulder 2c or projection 4a. In the case of the operational failure of boty systems "A" and "B" by rupture of one of the separating sealing means, the pressure prevailing in both will become equal to each other so that the piston 3 will make a substantial compensating movement for realizing the prescribed pressure ratio. In this case, also, the piston 3 will be brought into contact with the shoulder 2c or projection 4a.

In these cases the push rod 18 will follow after the moving piston 3 and be brought into contact by either of its shoulders 18d and 18e with stationary contact pin 25 which is embedded in the insulating and resilient material of the sleeve 24 so as to close the switch unit. In this way, the alarm lamp 27 is lit for indicating the operational failure as a dangerous accident and in the form of a visible alarm to the vehicle driver. The alarm lamp 27 may naturally be replaced by or added to a conventional audio alarm means, although not specifically shown.

The embodiments of the invention in which an exclusive property of privilege is claimed are as follows:

1. A dual hydraulic brake system for wheeled road vehicles having pairs of front and rear wheel brake assemblies in which each brake assembly includes first and second hydraulic working spaces of different diameters, piston means slidable in each working space, and brake means operable by at least one of the piston means when pressure is applied to its working space to effect braking, including a master cylinder having stepped bores, a stepped piston slidable in the bores providing two pressure generating chambers, means sealing the chambers from each other, a brake pedal operably connected to the piston for sliding the piston, a dual hydraulic system provided with hydraulic lines connecting the master cylinder with the pairs of front and rear wheel brake assemblies, and a pressure regulator valve provided for the hydraulic lines between the master cylinder and the pairs of front and rear brake assemblies, said regulator valve including a body provided with opposite closed ends and two bores of different diameters extending axially thereof, a piston having two axially spaced heads of different diameters received in the respective bores, an intermediate head on the piston cooperable with a shoulder defining the two bores to provide a stop for the piston in a neutral position thereof, one face of the piston head of larger diameter and one end of the body constituting a first space, the other face of the piston head of larger diameter and the shoulder constituting a second space, one face of the piston head of smaller diameter and the other end of the body constituting a third space, means associated with the pistons and bores separating the spaces from each other, said body having inlet ports communicating with the first and second spaces and the two pressure generating chambers of the master cylinder via lines of the hydraulic system, said body having outlet ports communicating with the first and second spaces, a frist spring in the first space, a second spring in the third space, with said first and second springs maintaining the piston in the neutral position, a push rod slidably mounted in the other end of the body and extending into the third space, the push rod having an inner end in contact with the one face of the piston head of smaller diameter, a third spring biasing the inner end of the push rod into contact with the one face of the piston head of smaller diameter, the outlet port from the first space communicating with the first working space of one of the pair of rear braking assemblies via hydraulic lines, the outlet port of the second space communicating with the second working space of the same one of the pair of rear braking assemblies via hydraulic lines, the outlet port of the first space communicating with the first working space of one of the pair of front braking assemblies via hydraulic lines, the outlet port of the second space communicating with the second working space of the same one of the pair of braking assemblies via hydraulic lines, thereby providing a first brake system defined by the pressure generating chamber of smaller diameter, of the master cylinder, the first space of the regulator valve, the hydraulic lines, and the first working spaces of the the rear and front braking assemblies, and a second brake system defined by the pressure generating chamber of larger diameter of the master cylinder, the second spaces of the regulator valve, the hydraulic lines and the second working spaces of the rear and front braking assemblies, an alarm circuit, and a contact coupled to the alarm circuit and being actuated by the push rod upon an operational failure of the system to operate the alarm circuit.

2. The brake system as claimed in claim 1 in which the contact is mounted in insulation in the regulator valve body, the push rod being provided with an annular groove into which the contact projects and upon displacement of the push rod to a position in which the contact engages one of the side walls of the groove, the alarm circuit is operated.

* * * * *